(12) United States Patent
Sarkar et al.

(10) Patent No.: US 7,900,700 B2
(45) Date of Patent: Mar. 8, 2011

(54) METHOD AND SYSTEM FOR CLEAT CHARACTERIZATION IN COAL BED METHANE WELLS FOR COMPLETION OPTIMIZATION

(75) Inventors: Arpana Sarkar, Mumbai (IN); Rajiv Sagar, Mumbai (IN); Theodore Klimentos, Mumbai (IN); Indrajit Basu, Al-khobar (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 198 days.

(21) Appl. No.: 12/184,099

(22) Filed: Jul. 31, 2008

(65) Prior Publication Data
US 2009/0032250 A1 Feb. 5, 2009

Related U.S. Application Data

(60) Provisional application No. 60/953,670, filed on Aug. 2, 2007.

(51) Int. Cl.
*E21B 47/14* (2006.01)
*G01V 1/09* (2006.01)

(52) U.S. Cl. .................. 166/250.01; 166/177.1; 181/114; 181/122; 367/14

(58) Field of Classification Search ............. 166/250.01, 166/177.1, 177.2; 181/101, 113, 114, 122, 181/401; 340/856.4; 367/14; 702/7, 11, 702/14
See application file for complete search history.

(56) References Cited

U.S. PATENT DOCUMENTS

| | | | |
|---|---|---|---|
| 3,720,912 A * | 3/1973 | Schmidt | 367/27 |
| 4,223,399 A * | 9/1980 | Hackett | 367/41 |
| 4,351,035 A * | 9/1982 | Buchanan et al. | 367/14 |
| 4,393,484 A * | 7/1983 | Buchanan et al. | 367/23 |
| 4,646,240 A * | 2/1987 | Serra et al. | 702/11 |
| 4,903,527 A * | 2/1990 | Herron | 73/152.05 |
| 5,260,911 A * | 11/1993 | Mason et al. | 367/57 |

(Continued)

FOREIGN PATENT DOCUMENTS
GB 2335158 A 9/1999

(Continued)

OTHER PUBLICATIONS

Schlumberger, "Well Evaluation for Coalbed Mathane," Sep. 2001, TSL-7509-2.

(Continued)

*Primary Examiner* — Kenneth Thompson
(74) *Attorney, Agent, or Firm* — Osha Liang LLP (57) ABSTRACT

The invention generally relates a method of determining completion criteria for a coal bed methane reservoir having a plurality of coal seams. The method involves obtaining an acoustic log and a resistivity image log for each of the plurality of coal seams, determining an acoustically determined cleat density for each of the plurality of coal seams using the corresponding acoustic logs, determining maximum horizontal stress direction for each of the plurality of coal seams using the corresponding acoustic logs; determining cleat orientation for each of the plurality of coal seams using the corresponding resistivity image logs, selecting one of the plurality of coal seams upon which to perform a completion operation based on the acoustically determined cleat density, maximum horizontal stress direction, and cleat orientation, and determining the completion criteria for the coal bed methane reservoir using the acoustically determined cleat density, maximum horizontal stress direction, and cleat orientation, where the completion operation is performed using on the coal bed method reservoir using the completion criteria.

29 Claims, 9 Drawing Sheets

U.S. PATENT DOCUMENTS

| | | | |
|---|---|---|---|
| 5,408,441 A * | 4/1995 | Barr et al. ................... 367/15 |
| 5,992,519 A | 11/1999 | Ramakrishnan et al. |
| 6,018,497 A | 1/2000 | Gunasekera |
| 6,078,869 A | 6/2000 | Gunasekera |
| 6,106,561 A | 8/2000 | Farmer |
| 6,108,497 A | 8/2000 | Nakayama et al. |
| 6,230,101 B1 | 5/2001 | Wallis |
| 6,263,284 B1 * | 7/2001 | Crider et al. ................. 702/14 |
| 6,313,837 B1 | 11/2001 | Assa et al. |
| 6,860,147 B2 | 3/2005 | Gunter et al. |
| 6,980,940 B1 | 12/2005 | Gurpinar et al. |
| 7,164,990 B2 | 1/2007 | Bratvedt et al. |
| 2003/0132934 A1 | 7/2003 | Fremming |
| 2003/0201098 A1 * | 10/2003 | Karanikas et al. ............. 166/53 |
| 2003/0216897 A1 | 11/2003 | Endres et al. |
| 2004/0220846 A1 | 11/2004 | Cullick et al. |
| 2005/0149307 A1 | 7/2005 | Gurpinar et al. |
| 2006/0129366 A1 | 6/2006 | Shaw |
| 2006/0184329 A1 | 8/2006 | Rowan et al. |
| 2006/0197759 A1 | 9/2006 | Fremming |
| 2007/0061087 A1 | 3/2007 | Ghorayeb et al. |
| 2007/0112547 A1 | 5/2007 | Ghorayeb et al. |

FOREIGN PATENT DOCUMENTS

| | | |
|---|---|---|
| WO | 99/64896 A1 | 12/1999 |
| WO | 9964896 A1 | 12/1999 |
| WO | 2004/049216 A1 | 6/2004 |
| WO | 2004049216 A1 | 6/2004 |
| WO | 2005/122001 A1 | 12/2005 |
| WO | 2005122001 A1 | 12/2005 |

OTHER PUBLICATIONS

Bossie-Codreanu, Dan et al., "A New Characterization Method for Coal Bed Methane," Geological Belgica, Jul. 3-4, 2004, pp. 137-145.

Karacan, C.O. et al., "Fracture/Cleat Analysis of Coals from Zonguldak Basin (Northwestern Turkey) relative to the potential of coalbed methane production," International Journal of Coal Geology, 2000, vol. 44, pp. 109-125.

Mohammad Ali, Arpana Sarkar, Rajiv Sagar, Theordore Klimentos and Indrajit Basu; "Cleat Characterization in CBM wells for completion Optimization", SPE 11360, Society of Petroleum Engineers; Presentation at the 2008 Indian Oil and Gas Technical Conference and Exhibition, Mumbai, India, Mar. 2008, (10 pages).

* cited by examiner

METHOD AND SYSTEM FOR CLEAT CHARACTERIZATION IN COAL BED METHANE WELLS FOR COMPLETION OPTIMIZATION

CROSS-REFERENCE TO RELATED APPLICATIONS

This application claims priority under 35 U.S.C. §119(e) to U.S. Provisional Application Ser. No. 60/953,670, filed on Aug. 2, 2007, and is hereby incorporated in its entirety.

BACKGROUND

Figure 1A:
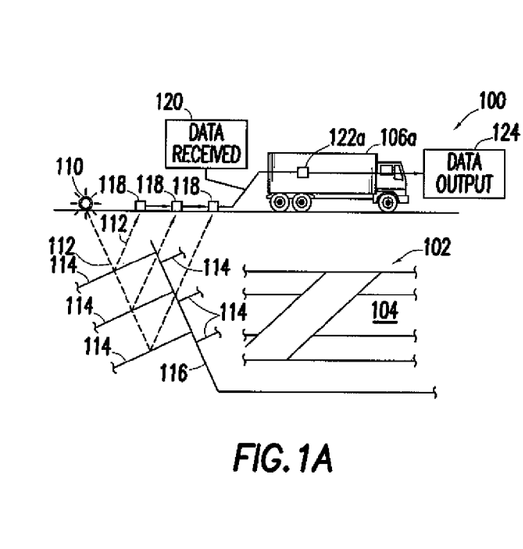
FIGS. 1A-1D show schematic views of an oilfield having subterranean structures including reservoirs therein and various oilfield operations being performed on the oilfield.

Oilfield operations, such as surveying, drilling, wireline testing, completions, simulation, planning and oilfield analysis, are typically performed to locate and gather valuable downhole fluids. Various aspects of the oilfield and its related operations are shown in FIGS. 1A-1D. As shown in FIG. 1A, surveys are often performed using acquisition methodologies, such as seismic scanners to generate maps of underground structures. These structures are often analyzed to determine the presence of subterranean assets, such as valuable fluids or minerals. This information is used to assess the underground structures and locate the formations containing the desired subterranean assets. Data collected from the acquisition methodologies may be evaluated and analyzed to determine whether such valuable items are present, and if they are reasonably accessible.

Figure 1B:
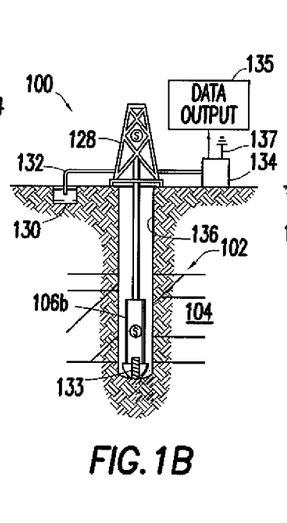
Figure 1C:
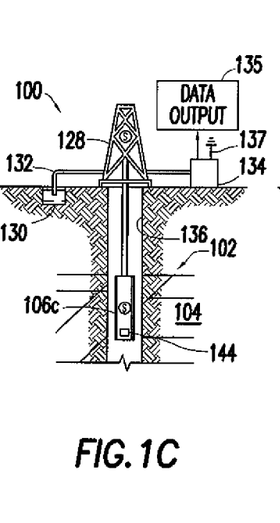
Figure 1D:
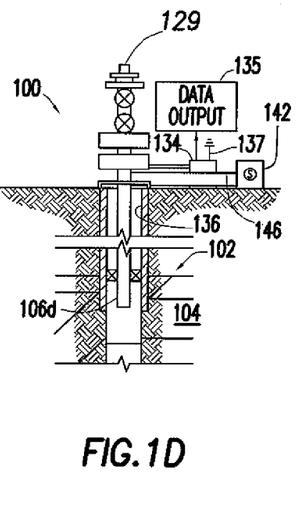

As shown in FIG. 1B-1D, one or more wellsites may be positioned along the underground structures to gather valuable fluids from the subterranean reservoirs. The wellsites are provided with tools capable of locating and removing hydrocarbons from the subterranean reservoirs. As shown in FIG. 1B, drilling tools are typically advanced from the oil rigs and into the earth along a given path to locate the valuable downhole fluids. During the drilling operation, the drilling tool may perform downhole measurements to investigate downhole conditions. In some cases, as shown in FIG. 1C, the drilling tool is removed and a wireline tool is deployed into the wellbore to perform additional downhole testing.

After the drilling operation is complete, the well may then be prepared for production. As shown in FIG. 1D, wellbore completions equipment is deployed into the wellbore to complete the well in preparation for the production of fluid therethrough. Fluid is then drawn from downhole reservoirs, into the wellbore and flows to the surface. Production facilities are positioned at surface locations to collect the hydrocarbons from the wellsite(s). Fluid drawn from the subterranean reservoir(s) passes to the production facilities via transport mechanisms, such as tubing. Various equipments may be positioned about the oilfield to monitor oilfield parameters and/or to manipulate the oilfield operations.

During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to, for example, formation structure and geological stratigraphy that define the geological structure of the subterranean formation. Dynamic data relates to, for example, fluids flowing through the geologic structures of the subterranean formation over time. Such static and/or dynamic data may be collected to learn more about the formations and the valuable assets contained therein.

Sources used to collect static data may be seismic tools, such as a seismic truck that sends compression waves into the earth as shown in FIG. 1A. These waves are measured to characterize changes in the density of the geological structure at different depths. This information may be used to generate basic structural maps of the subterranean formation. Other static measurements may be gathered using core sampling and well logging techniques. Core samples may be used to take physical specimens of the formation at various depths as shown in FIG. 1B. Well logging typically involves deployment of a downhole tool into the wellbore to collect various downhole measurements, such as density, resistivity, etc., at various depths. Such well logging may be performed using, for example, the drilling tool of FIG. 1B and/or the wireline tool of FIG. 1C. Once the well is formed and completed, fluid flows to the surface using production tubing as shown in FIG. 1D. As fluid passes to the surface, various dynamic measurements, such as fluid flow rates, pressure, and composition may be monitored. These parameters may be used to determine various characteristics of the subterranean formation.

Sensors may be positioned about the oilfield to collect data relating to various oilfield operations. For example, sensors in the drilling equipment may monitor drilling conditions, sensors in the wellbore may monitor fluid composition, sensors located along the flow path may monitor flow rates, and sensors at the processing facility may monitor fluids collected. Other sensors may be provided to monitor downhole, surface, equipment or other conditions. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The processed data may be used to predict downhole conditions, and make decisions concerning oilfield operations. Such decisions may involve well planning, well targeting, well completions, operating levels, production rates and other operations and/or conditions. Often this information is used to determine when to drill new wells, re-complete existing wells, or alter wellbore production.

Data from one or more wellbores may be analyzed to plan or predict various outcomes at a given wellbore. In some cases, the data from neighboring wellbores or wellbores with similar conditions or equipment may be used to predict how a well will perform. There are usually a large number of variables and large quantities of data to consider in analyzing oilfield operations. It is, therefore, often useful to model the behavior of the oilfield operation to determine the desired course of action. During the ongoing operations, the operating conditions may need adjustment as conditions change and new information is received.

Techniques have been developed to model the behavior of various aspects of the oilfield operations, such as geological structures, downhole reservoirs, wellbores, surface facilities as well as other portions of the oilfield operation. Typically, there are different types of simulators for different purposes. For example, there are simulators that focus on reservoir properties, wellbore production, or surface processing. Examples of simulators that may be used at the wellsite are described in U.S. Pat. No. 5,992,519, US2007/0061087 and WO2004/049216. Other examples of these modeling techniques are shown in U.S. Pat. No. 5,992,519, U.S. Pat. No. 6,313,837, WO1999/064896, WO2005/122001, US2003/0216897, US2003/0132934, US2005/0149307, and US2006/0197759.

Typically, simulators are designed to model specific behavior of discrete portions of the wellbore operation. Due to the complexity of the oilfield operation, most simulators are capable of only evaluating a specific segment of the overall production system, such as simulation of the reservoir. Simulations of portions of the wellsite operation, such as reservoir simulation, flow through the wellbore or surface processing, are usually considered and used individually.

A change in any segment of the production system, however, often has cascading effects on the upstream and downstream segments of the production system. For example, restrictions in the surface network can reduce productivity of the reservoir. Separate simulations typically fail to consider the data or outputs of other simulators, and fail to consider these cascading effects.

Recent attempts have been made to consider a broader range of data in oilfield operations. For example, U.S. Pat. No. 6,980,940 issued to Gurpinar discloses integrated reservoir optimization involving the assimilation of diverse data to optimize overall performance of a reservoir. In another example, Application No. WO2004/049216 with first named inventor Ghorayeb discloses an integrated modeling solution for coupling multiple reservoir simulations and surface facility networks. Other examples of such recent attempts are disclosed in U.S. Pat. Nos. 6,230,101, 6,018,497, 6,078,869, GB2335158, U.S. Pat. No. 6,106,561, US2006/0184329, U.S. Pat. No. 7,164,990, US2004/0220846, and U.S. Ser. No. 10/586,283. Some simulation techniques involve the use of coupled simulations as described, for example, in Publication No. US2006/0129366.

Despite the development and advancement of mechanisms to identify suitable reservoirs (e.g., coal bed methane (CBM) reservoirs) for completion, there remains a need for techniques for determining coal seams in CBM reservoirs having high cleat densities.

SUMMARY

In general, in one aspect, the invention relates to a method of determining completion criteria for a coal bed methane reservoir having a plurality of coal seams. The method involves obtaining an acoustic log and a resistivity image log for each of the plurality of coal seams, determining an acoustically determined cleat density for each of the plurality of coal seams using the corresponding acoustic logs, determining maximum horizontal stress direction for each of the plurality of coal seams using the corresponding acoustic logs, determining cleat orientation for each of the plurality of coal seams using the corresponding resistivity image logs, selecting one of the plurality of coal seams upon which to perform a completion operation based on the acoustically determined cleat density, maximum horizontal stress direction, and cleat orientation; and determining the completion criteria for the coal bed methane reservoir using the acoustically determined cleat density, maximum horizontal stress direction, and cleat orientation, where the completion operation is performed using on the coal bed method reservoir using the completion criteria.

In general, in one aspect, the invention relates to a computer readable medium, embodying instructions executable by the computer to perform method steps for determining completion criteria for a coal bed methane reservoir comprising a plurality of coal seams. The instructions comprise functionality to obtain an acoustic log and a resistivity image log for each of the plurality of coal seams; determine an acoustically determined cleat density for each of the plurality of coal seams using the correspond acoustic logs, determine maximum horizontal stress direction for each of the plurality of coal seams using the corresponding acoustic logs, determine cleat orientation for each of the plurality of coal seams using the corresponding resistivity image logs, select one of the plurality of coal seams upon which to perform a completion operation to based on the acoustically determined cleat density, maximum horizontal stress direction, and cleat orientation; and determine the completion criteria for the coal bed methane reservoir using the acoustically determined cleat density, maximum horizontal stress direction, and cleat orientation, wherein the completion operation is performed using on the coal bed method reservoir using the completion criteria.

In general, in one aspect, the invention relates to a method of determining completion criteria for a coal bed methane reservoir comprising a coal seams. The method comprises obtaining an acoustic log and a resistivity image log for the coal seam; determining an acoustically determined cleat density for the coal seam using the acoustic log; determining a maximum horizontal stress direction for the coal seam using the acoustic log, determining a cleat orientation for the coal seam using the resistivity image log, and determining the completion criteria for the coal bed methane reservoir using the acoustically determined cleat density, the maximum horizontal stress direction, and the cleat orientation, wherein the coal bed method reservoir is completed using the completion criteria.

Other aspects of the invention will be apparent from the following description and the appended claims.

BRIEF DESCRIPTION OF DRAWINGS

FIG. 1A depicts an exemplary survey operation being performed by a seismic truck. FIG. 1B depicts an exemplary drilling operation being performed by a drilling tool suspended by a rig and advanced into the subterranean formation. FIG. 1C depicts an exemplary wireline operation being performed by a wireline tool suspended by the rig and into the wellbore of FIG. 1B. FIG. 1D depicts an exemplary production operation being performed by a production tool being deployed from the rig and into a completed wellbore for drawing fluid from the downhole reservoir into a surface facility.

FIG. 2A depicts an exemplary seismic trace of the subterranean formation of FIG. 1A. FIG. 2B depicts exemplary core sample of the formation shown in FIG. 1B. FIG. 2C depicts an exemplary well log of the subterranean formation of FIG. 1C. FIG. 2D depicts an exemplary production decline curve of fluid flowing through the subterranean formation of FIG. 1D.

DETAILED DESCRIPTION

Specific embodiments of the invention will now be described in detail with reference to the accompanying figures. Like elements in the various figures are denoted by like reference numerals for consistency. The figures are not necessarily to scale and certain features and certain views of the figures may be shown exaggerated in scale or in schematic in the interest of clarity and conciseness.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to identify a coal seam for completion using acoustic data and/or image data. In general embodiments of the invention provide a method and apparatus to verify the acoustically determined cleat density of a coal seam based on image data corresponding to said coal seam.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

FIGS. 1A-D show an oilfield (100) having geological structures and/or subterranean formations therein. As shown in these figures, various measurements of the subterranean formation are taken by different tools at the same location. These measurements may be used to generate information about the formation and/or the geological structures and/or fluids contained therein.

FIGS. 1A-1D depict schematic views of an oilfield (100) having subterranean formations (102) containing a reservoir (104) therein and depicting various oilfield operations being performed on the oilfield (100). FIG. 1A depicts a survey operation being performed by a seismic truck (106a) to measure properties of the subterranean formation. The survey operation is a seismic survey operation for producing sound vibration(s) (112). In FIG. 1A, one such sound vibration (112) is generated by a source (110) and reflects off a plurality of horizons (114) in an earth formation (116). The sound vibration(s) (112) is (are) received in by sensors (S), such as geophone-receivers (118), situated on the earth's surface, and the geophone-receivers (118) produce electrical output signals, referred to as data received (120) in FIG. 1.

In response to the received sound vibration(s) (112) representative of different parameters (such as amplitude and/or frequency) of the sound vibration(s) (112). The data received (120) is provided as input data to a computer (122a) of the seismic recording truck (106a), and responsive to the input data, the recording truck computer (122a) generates a seismic data output record (124). The seismic data may be further processed as desired, for example by data reduction.

FIG. 1B depicts a drilling operation being performed by a drilling tool (106b) suspended by a rig (128) and advanced into the subterranean formation (102) to form a wellbore (136). A mud pit (130) is used to draw drilling mud into the drilling tool (106b) via flow line (132) for circulating drilling mud through the drilling tool (106b) and back to the surface. The drilling tool (106b) is advanced into the formation to reach reservoir (104). The drilling tool (106b) is preferably adapted for measuring downhole properties. The drilling tool (106b) may also be adapted for taking a core sample (133) as shown, or removed so that a core sample (133) may be taken using another tool.

A surface unit (134) is used to communicate with the drilling tool (106b) and offsite operations. The surface unit (134) is capable of communicating with the drilling tool (106b) to send commands to drive the drilling tool (106b), and to receive data therefrom. The surface unit (134) is preferably provided with computer facilities for receiving, storing, processing, and analyzing data from the oilfield (100). The surface unit (134) collects data output (135) generated during the drilling operation. Computer facilities, such as those of the surface unit (134), may be positioned at various locations about the oilfield (100) and/or at remote locations.

Sensors (S), such as gauges, may be positioned throughout the reservoir, rig, oilfield equipment (such as the downhole tool), or other portions of the oilfield for gathering information about various parameters, such as surface parameters, downhole parameters, and/or operating conditions. These sensors (S) preferably measure oilfield parameters, such as weight on bit, torque on bit, pressures, temperatures, flow rates, compositions and other parameters of the oilfield operation.

The information gathered by the sensors (S) may be collected by the surface unit (134) and/or other data collection sources for analysis or other processing. The data collected by the sensors (S) may be used alone or in combination with other data. The data may be collected in a database and all or select portions of the data may be selectively used for analyzing and/or predicting oilfield operations of the current and/or other wellbores.

Data outputs from the various sensors (S) positioned about the oilfield may be processed for use. The data may be historical data, real time data, or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical, reservoir engineering, and/or production simulations. The reservoir, wellbore, surface and/or process data may be used to perform reservoir, wellbore, or other production simulations. The data outputs from the oilfield operation may be generated directly from the sensors (S), or after some preprocessing or modeling. These data outputs may act as inputs for further analysis.

The data is collected and stored at the surface unit (134). One or more surface units (134) may be located at the oilfield (100), or linked remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user.

The surface unit (134) may be provided with a transceiver (137) to allow communications between the surface unit (134) and various portions (or regions) of the oilfield (100) or other locations. The surface unit (134) may also be provided with or functionally linked to a controller for actuating mechanisms at the oilfield (100). The surface unit (134) may then send command signals to the oilfield (100) in response to data received. The surface unit (134) may receive commands via the transceiver or may itself execute commands to the controller. A processor may be provided to analyze the data (locally or remotely) and make the decisions to actuate the controller. In this manner, the oilfield (100) may be selectively adjusted based on the data collected to optimize fluid recovery rates, or to maximize the longevity of the reservoir and its ultimate production capacity. These adjustments may be made automatically based on computer protocol, or manually by an operator. In some cases, well plans may be adjusted to select optimum operating conditions, or to avoid problems.

FIG. 1C depicts a wireline operation being performed by a wireline tool (106c) suspended by the rig (128) and into the wellbore (136) of FIG. 1B. The wireline tool (106c) is preferably adapted for deployment into a wellbore (136) for performing well logs, performing downhole tests and/or collecting samples. The wireline tool (106c) may be used to provide another method and apparatus for performing a seismic survey operation. The wireline tool (106c) of FIG. 1C may have an explosive or acoustic energy source (143) that provides electrical signals to the surrounding subterranean formations (102).

The wireline tool (106c) may be operatively linked to, for example, the geophones (118) stored in the computer (122a) of the seismic recording truck (106a) of FIG. 1A. The wireline tool (106c) may also provide data to the surface unit (134). As shown data output (135) is generated by the wireline tool (106c) and collected at the surface. The wireline tool (106c) may be positioned at various depths in the wellbore (136) to provide a survey of the subterranean formation.

FIG. 1D depicts a production operation being performed by a production tool (106d) deployed from the rig (128) and into the completed wellbore (136) of FIG. 1C for drawing fluid from the downhole reservoirs into surface facilities (142). Fluid flows from reservoir (104) through wellbore (136) and to the surface facilities (142) via a surface network (144). Sensors (S) positioned about the oilfield (100) are operatively connected to a surface unit (142) for collecting data therefrom. During the production process, data output (135) may be collected from various sensors (S) and passed to the surface unit (134) and/or processing facilities. This data may be, for example, reservoir data, wellbore data, surface data, and/or process data.

While FIGS. 1A-1D depict monitoring tools used to measure properties of an oilfield (100), it will be appreciated that the tools may be used in connection with non-oilfield operations, such as mines, aquifers or other subterranean facilities. Also, while certain data acquisition tools are depicted, it will be appreciated that various measurement tools capable of sensing properties, such as seismic two-way travel time, density, resistivity, production rate, etc., of the subterranean formation and/or its geological structures may be used. Various sensors (S) may be located at various positions along the subterranean formation and/or the monitoring tools to collect and/or monitor the desired data. Other sources of data may also be provided from offsite locations.

The oilfield configuration in FIGS. 1A-1D is not intended to limit the scope of the invention. Part, or all, of the oilfield (100) may be on land and/or sea. Also, while a single oilfield at a single location is depicted, the present invention may be used with any combination of one or more oilfields (100), one or more processing facilities and one or more wellsites. Additionally, while only one wellsite is shown, it will be appreciated that the oilfield (100) may cover a portion of land that hosts one or more wellsites. One or more gathering facilities may be operatively connected to one or more of the wellsites for selectively collecting downhole fluids from the wellsite(s).

Figure 2A:
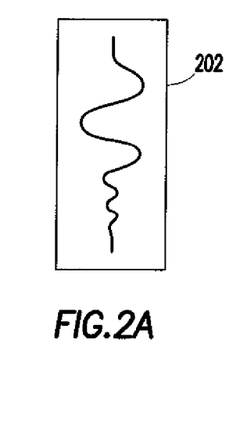
FIGS. 2A-2D show graphical depictions of data collected by the tools of FIGS. 1A-1D, respectively.
Figure 2B:
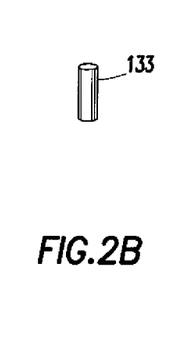
Figure 2C:
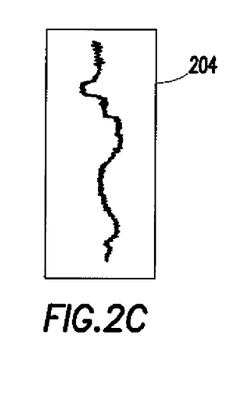
Figure 2D:
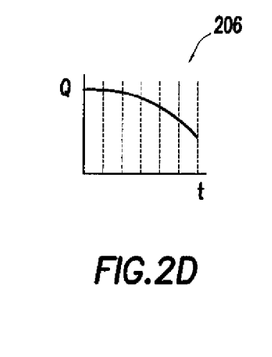

FIGS. 2A-2D show graphical depictions of data collected by the tools of FIGS. 1A-D, respectively. FIG. 2A depicts a seismic trace (202) of the subterranean formation of FIG. 1A taken by survey tool (106a). The seismic trace measures a two-way response over a period of time. FIG. 2B depicts a core sample (133) taken by the drilling tool (106b). The core test typically provides a graph of the density, resistivity, or other physical property of the core sample (133) over the length of the core. Tests for density and viscosity are often performed on the fluids in the core at varying pressures and temperatures. FIG. 2C depicts a well log (204) of the subterranean formation of FIG. 1C taken by the wireline tool (106c). The wireline log typically provides a resistivity measurement of the formation at various depths. FIG. 2D depicts a production decline curve (206) of fluid flowing through the subterranean formation of FIG. 1D taken by the production tool (106d). The production decline curve (206) typically provides the production rate Q as a function of time t.

The respective graphs of FIGS. 2A-2C contain static measurements that describe the physical characteristics of the formation. These measurements may be compared to determine the accuracy of the measurements and/or for checking for errors. In this manner, the plots of each of the respective measurements may be aligned and scaled for comparison and verification of the properties.

FIG. 2D provides a dynamic measurement of the fluid properties through the wellbore. As the fluid flows through the wellbore, measurements are taken of fluid properties, such as flow rates, pressures, composition, etc. As described below, the static and dynamic measurements may be used to generate models of the subterranean formation to determine characteristics thereof.

Figure 3:
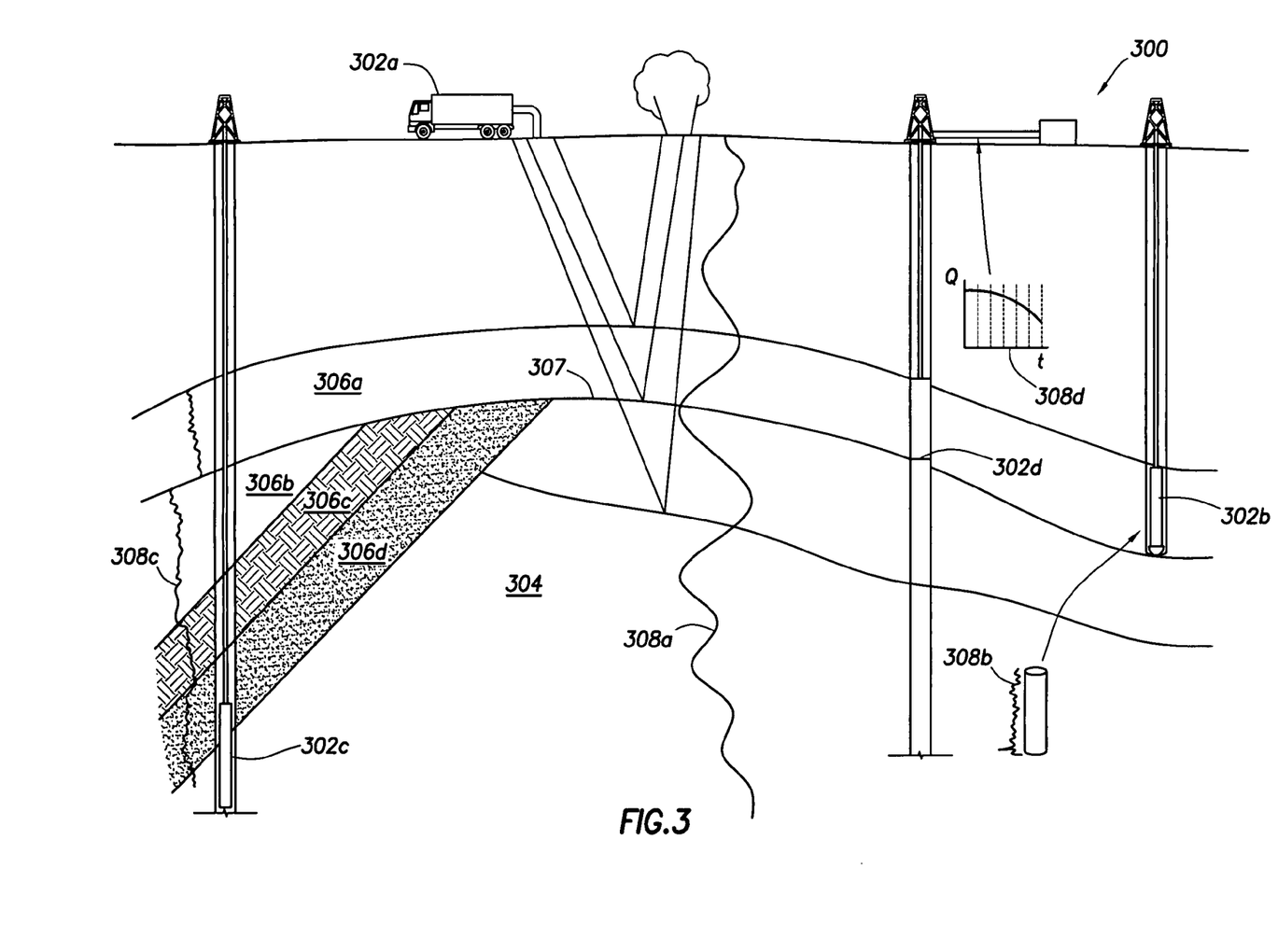
FIG. 3 depicts a schematic view, partially in cross section, of an oilfield having a plurality of data acquisition tools positioned at various locations along the oilfield for collecting data from the subterranean formation.

FIG. 3 depicts a schematic view, partially in cross section of an oilfield (300) having data acquisition tools (302a), (302b), (302c), and (302d) positioned at various locations along the oilfield for collecting data of a subterranean formation (304). The data acquisition tools (302a-302d) may be the same as data acquisition tools (106a-106d) of FIG. 1, respectively. As shown, the data acquisition tools (302a-302d) generate data plots or measurements (308a-308d), respectively.

Data plots (308a-308c) are examples of static data plots that may be generated by the data acquisition tools (302a-302d), respectively. Static data plot (308a) is a seismic two-way response time and may be the same as the seismic trace (202) of FIG. 2A. Static plot (308b) is core sample data measured from a core sample of the formation (304), similar to the core sample (133) of FIG. 2B. Static data plot (308c) is a logging trace, similar to the well log (204) of FIG. 2C. Data plot (308d) is a dynamic data plot of the fluid flow rate over time, similar to the graph (206) of FIG. 2D. Other data may also be collected, such as historical data, user inputs, economic information, other measurement data, and other parameters of interest.

The subterranean formation (304) has a plurality of geological structures (306a-306d). As shown, the formation has a shale layer (306a), a sand layer (306b), a coal seam (306c), and an addition sand layer (306d). A fault line (307) extends through the formation (304). The static data acquisition tools are preferably adapted to measure the formation and detect the characteristics of the geological structures of the formation (304).

While a specific subterranean formation (304) with specific geological structures are depicted, it will be appreciated that the formation (304) may contain a variety of geological structures. Fluid may also be present in various portions of the formation (304). Each of the measurement devices may be used to measure properties of the formation (304) and/or its underlying structures (not shown). While each acquisition tool is shown as being in specific locations along the formation (304), it will be appreciated that one or more types of measurement may be taken at one or more location across one or more oilfields or other locations for comparison and/or analysis.

The data collected from various sources, such as the data acquisition tools of FIG. 3, may then be evaluated. Typically, seismic data displayed in the static data plot (308a) from the data acquisition tool (302a) is used by a geophysicist to determine characteristics of the subterranean formation (304). Core data shown in static plot (308b) and/or log data from the well log (308c) is typically used by a geologist to determine various characteristics of the geological structures of the subterranean formation (304). Production data from the production graph (308d) is typically used by the reservoir engineer to determine fluid flow reservoir characteristics.

Figure 4:
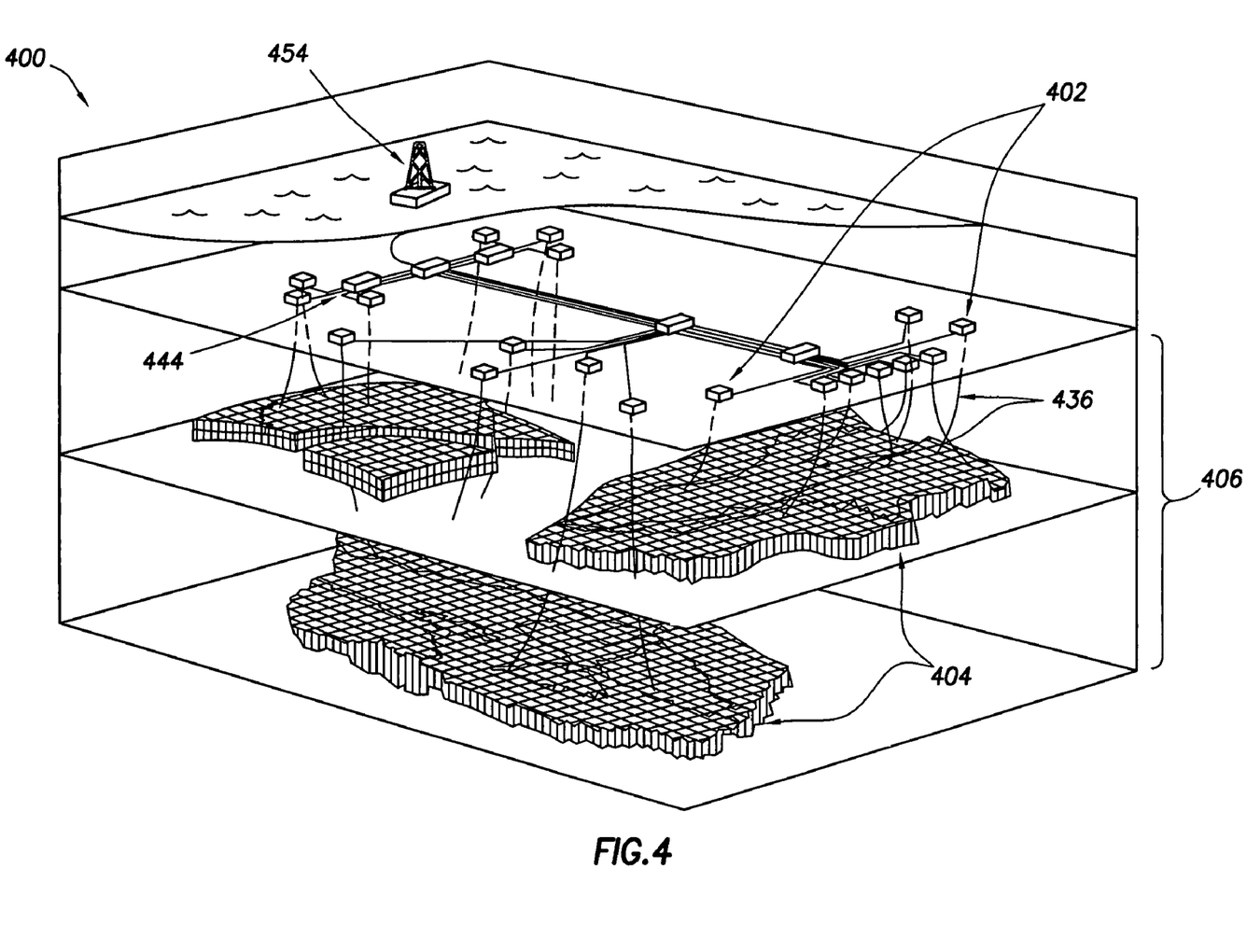
FIG. 4 depicts a schematic view of an oilfield having a plurality of wellsites for producing hydrocarbons from the subterranean formation.

FIG. 4 depicts an oilfield (400) for performing production operations. As shown, the oilfield (400) has a plurality of wellsites (402) operatively connected to a central processing facility (454). The oilfield configuration of FIG. 4 is not intended to limit the scope of the invention. Part or all of the oilfield (400) may be on land and/or sea. Also, while a single oilfield with a single processing facility and a plurality of wellsites is depicted, any combination of one or more oilfields, one or more processing facilities and one or more wellsites may be present.

Each wellsite (402) has equipment that forms a wellbore (436) into the earth. The wellbores extend through subterranean formations (406) including reservoirs (404). In one or more embodiments of the invention, these reservoirs (404) are coal bed methane (CBM) reservoirs and contain fluids, such as hydrocarbons. The wellsites (402) draw fluid from the reservoirs (404) and pass them to the processing facilities via surface networks (444). The surface networks (444) have tubing and control mechanisms for controlling the flow of fluids from the wellsite (402) to the processing facility (454).

Figure 5:
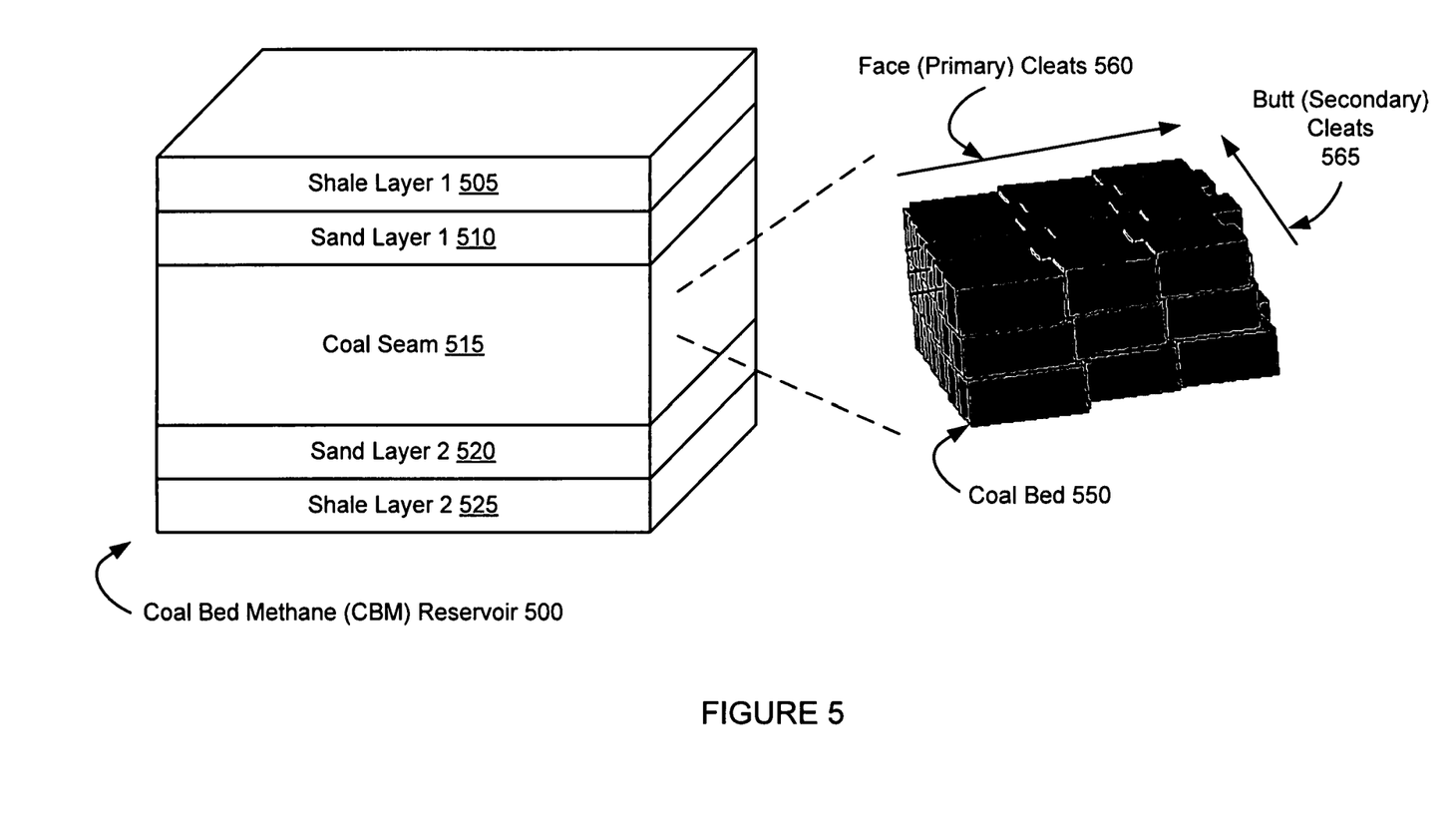
FIG. 5 depicts a coal bed methane (CBM) reservoir for producing hydrocarbons.

FIG. 5 depicts a section of a CBM reservoir (500) in accordance with one or more embodiments of the invention. As shown in FIG. 5, the CBM reservoir (500) includes a coal seam (515) situated between multiple layers of sand (i.e., Sand Layer 1 (510), Sand Layer 2 (520)) and multiple layers of shale (i.e., Shale Layer 1 (505), Shale Layer 2 (525)). The coal seam (515) includes one or more coal beds (550), and each coal bed (550) includes: (i) extended, continuous fractures classified as face or primary cleats (560); and (ii) subsidiary, shorter length fractures classified as butt or secondary cleats (565).

A cleat system (i.e., face cleats (560) and butt cleats (565)) is a fracture system including the primary flow path within the CBM reservoir (500). In other words, the cleats (560, 565) define the CBM reservoir character and fluid flow potential. Although the CBM reservoir (500) of FIG. 5 includes only a single coal seam (515), a CBM reservoir may penetrate multiple coal seams (not shown). Proper characterization of the cleats in each coal seam is useful in determining which coal seam(s) should be completed to improve production of the CBM reservoir (500).

Cleat genesis is commonly caused by the interdependent influences of desiccation, lithification, coalification, and paleotechtonic stress. Cleating in the coal seam (515) may range in spacing from a small fraction of an inch to several inches depending on coal rank and bed thickness. The amount of cleating in the coal seam (515) is generally related to coal rank, vitrinite content, mineral matter content, and tectonic activity of the CBM reservoir (500).

Figure 6:
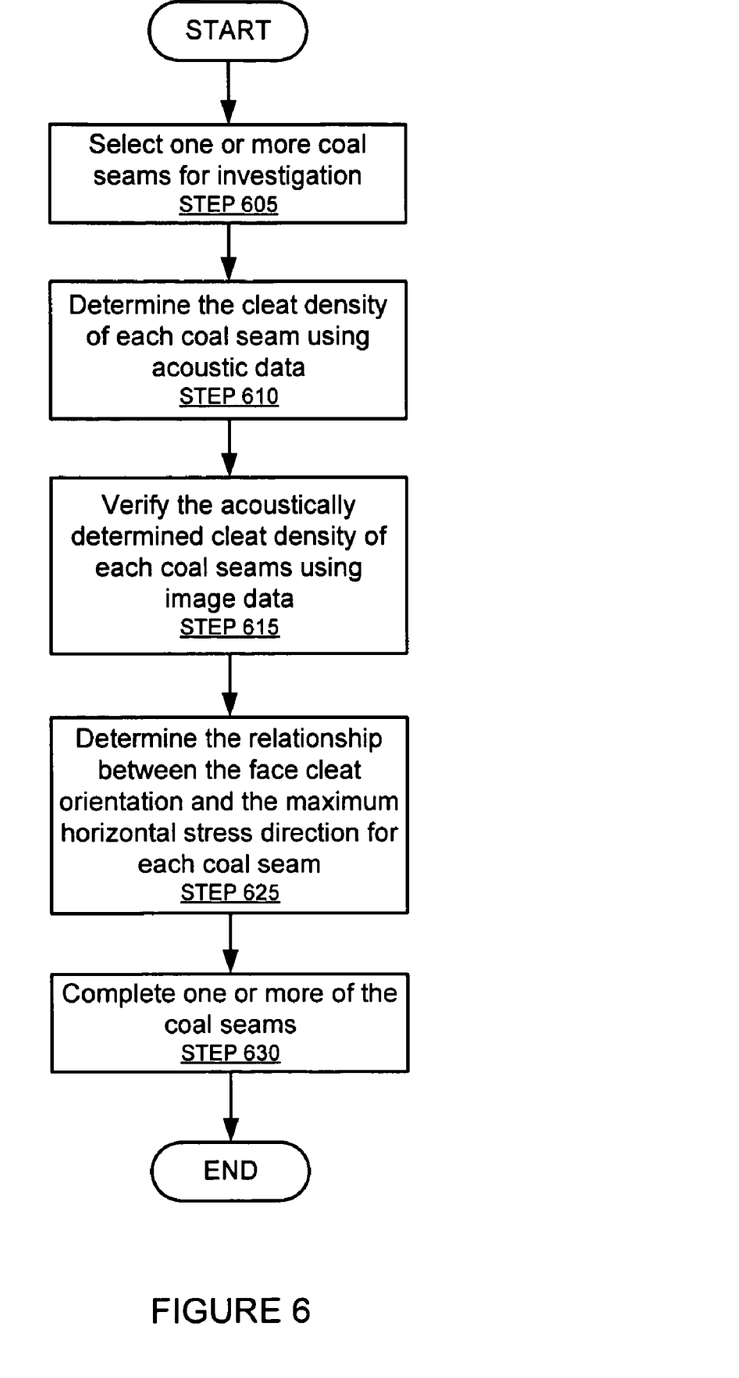
FIGS. 6-8 depict flow charts in accordance with one or more embodiments of the invention.

FIG. 6 depicts a flowchart in accordance with one or more embodiments of the invention. The process set forth in FIG. 6 may be used to begin and/or improve production of a CBM reservoir (e.g., CBM reservoir (500) discussed above in reference to FIG. 5). Those skilled in the art, having the benefit of this detailed description, will appreciate that some steps in FIG. 6 may be omitted, repeated, and/or rearranged in a different order than that shown in FIG. 6. Accordingly, the specific arrangement of steps shown in FIG. 6 should not be construed as limiting the scope of the invention.

Initially, coal seams are selected for investigation (i.e., for characterization) (STEP 605). The selected coal seams may be penetrated by a single CBM reservoir, or said coal seams may be penetrated by multiple CBM reservoirs in one or more oilfields. In STEP 610, the cleat density of each coal seam is determined by analyzing acoustic data (e.g., acoustic logs). In STEP 615, the acoustically determined cleat density of each coal seam is verified/validated by analyzing image data (e.g., image logs). In STEP 625, the relationship between the face cleat orientation and the maximum horizontal stress (HS) direction is determined for each coal seam. In STEP 630, one or more of the coal seams are selected for completion based on the cleat density, the face cleat orientation, and the maximum horizontal stress (HS) direction. The steps of FIG. 6 are described in detail below.

Although the process depicted in FIG. 6 uses image data to verify acoustically determined cleat densities, in one or more embodiments of the invention, the acoustic data is used to verify cleat densities determined from image data.

Figure 7:
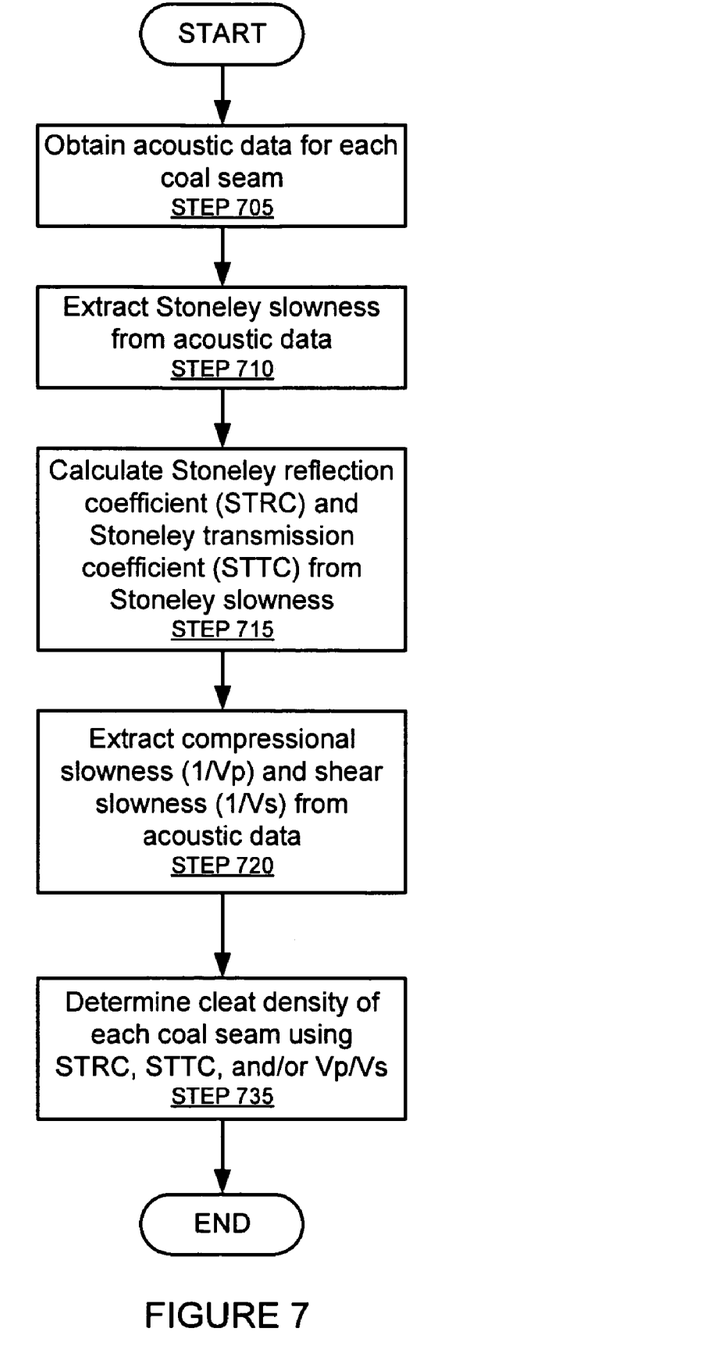

In STEP 610, the cleat density of each coal seam is determined using acoustic data. FIG. 7 depicts a process for determining the cleat density of a coal seam using acoustic data. Those skilled in the art, having the benefit of this detailed description, will appreciate that some steps in FIG. 7 may be omitted, repeated, and/or rearranged in a different order than that shown in FIG. 7. Accordingly, the specific arrangement of steps shown in FIG. 7 should not be construed as limiting the scope of the invention.

Initially, acoustic data is obtained for each selected coal seam (STEP 705). The acoustic data may be an acoustic log (i.e., a recording of acoustic properties as functions of depth) for an entire CBM reservoir or for a specific coal seam within the CBM reservoir. In one or more embodiments of the invention, obtaining acoustic data includes performing a full waveform sonic acquisition to obtain a monopole waveform (e.g., Stoneley waveform, compressional waveform) and a flexural waveform over a range of frequencies.

In STEP 710, a Stoneley slowness value is extracted from the acoustic data at multiple depths within each coal seam. In one or more embodiments of the invention, each of the Stoneley slowness values are extracted from the obtained monopole waveform using a slowness time coherence (STC) technique. Those skilled in the art, having the benefit of this detailed description, will appreciate a Stoneley waveform is sensitive to the formation/borehole interface. Accordingly, changes in permeability and the presence of open fractures along said interface attenuate the Stoneley waveform and affect the slowness of the measured Stoneley waveform.

In STEP 715, a Stoneley reflection coefficient (STRC) and a Stoneley transmission coefficient (STTC) are calculated for each of the extracted Stoneley slowness values (i.e., STEP 710). Those skilled in the art, having the benefit of this detailed description, will appreciate that in highly cleated coal seams (i.e., coal seams of high cleat density), transmitted Stoneley wave energies are attenuated and reflected Stoneley wave energies are negligible. As a result, the calculated STTC and STRC values are small within coal seams of high cleat density.

In STEP 720, a shear slowness (1/Vs) value and a compressional slowness (1/Vp) value are extracted from the acoustic data at multiple depths within each coal seam. In one or more embodiments of the invention, said multiple depths correspond to the multiple depths discussed above in reference to STEP 710. A Vs value is a measurement of shear modulus (i.e., a modulus of rigidity). The presence of high fractures (i.e., cleats) in a soft rock like coal reduces the rigidity of formation, which in turn reduces Vs. A Vs value may be extracted from the obtained flexural waveform using a dispersive STC technique and bias correction. In contrast, a Vp value may be extracted from the obtained monopole waveform.

In STEP 735, the cleat density of each coal seam is determined using STRC, STTC, and/or Vp/Vs. In one or more embodiments of the invention, determining the cleat density of each coal seam corresponds to determining the cleat density of each coal seam relative to other coal seams (i.e., ranking the multiple coal seams according to increasing (or decreasing) cleat density).

As discussed above, a coal seam with low STRC and STTC values indicates said coal seam has a high cleat density. As also discussed above, a coal seam having low Vs values also indicates said coal seam has a high cleat density. Accordingly, coal seams having low STRC and STTC values and/or low Vs values may be deemed as having a high cleat density and thus having a high potential for production (e.g., production of hydrocarbons).

In one or more embodiments of the invention, ranking multiple coal seams according to cleat density includes generating a chart having the Vp/Vs ratio as one axis, compressional slowness as a second axis, and depth as a third axis. The corresponding values for each coal seam may be plotted on said chart. The cleat density of a coal seam may be ranked according to the average or median of said coal seam's Vp/Vs ratios. Thus, a coal seam with a high average or high median Vp/Vs ratio is deemed as having a higher cleat density than a coal seam with a smaller average or a smaller median Vp/Vs ratio.

In one or more embodiments of the invention, ranking multiple coal seams according to cleat density includes generating a chart having STRC or STTC as one axis, and compressional slowness and a second axis. The corresponding values for each coal seam may be plotted on said chart. The cleat density of a coal seam may be ranked according to the average or median of said coals seam's STRC and/or STTC values. Thus, a coal seam with a low average or low median STRC or STTC value is deemed as having a higher cleat density than a coal seam with a higher average or higher median STRC or STTC value.

Figure 8:
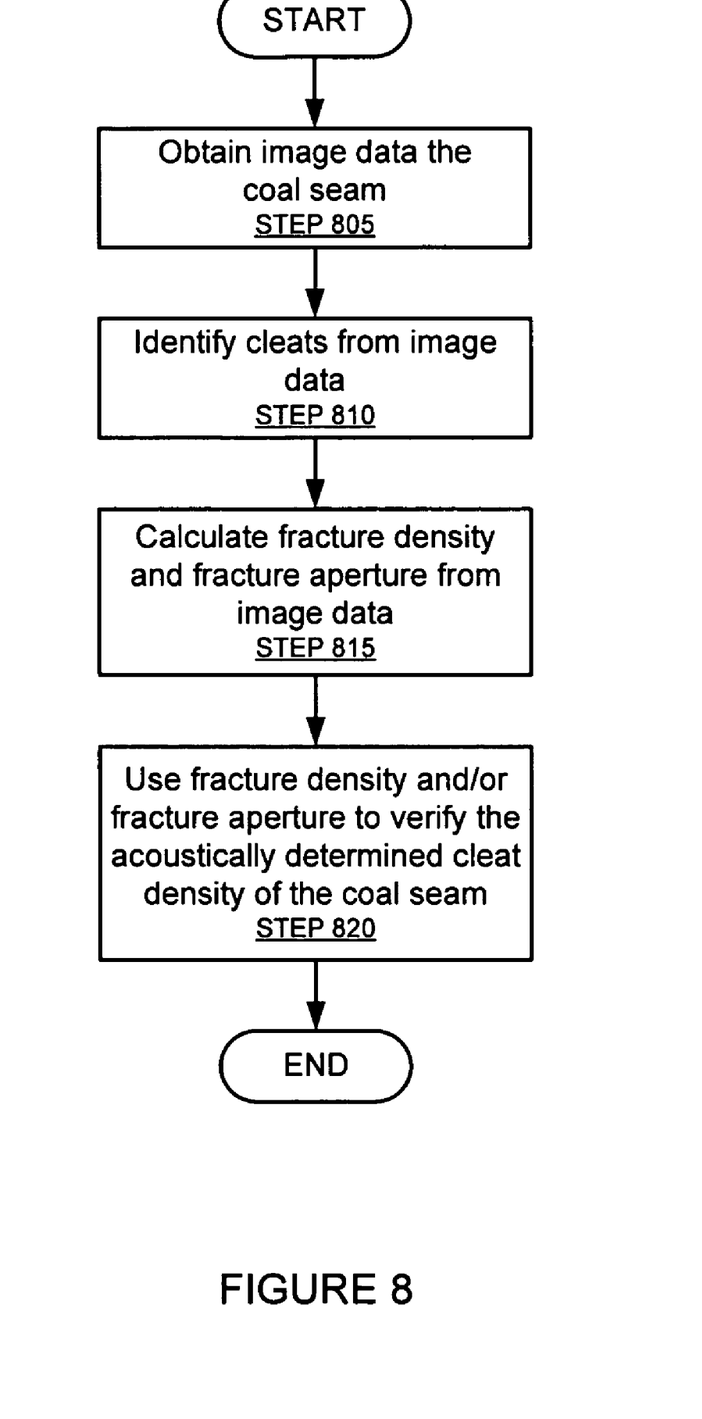

Referring back to FIG. 6, in STEP 615 the acoustically determined cleat density of each coal seam is verified using image data. FIG. 8 shows a process for verifying (e.g., validating) the acoustically determined cleat density of a coal seam. Those skilled in the art, having the benefit of this detailed description, will appreciate that some steps in FIG. 8 may be omitted, repeated, and/or rearranged in a different order than that shown in FIG. 8. Accordingly, the specific arrangement of steps shown in FIG. 8 should not be construed as limiting the scope of the invention.

Initially, image data for the coal seam is obtained (STEP 805). The image data may be a borehole electrical image log (i.e., a recording of electrical micro-resistivity properties as functions of depth) for an entire CBM reservoir or for a specific coal seam within the CBM reservoir. The borehole electrical image log must be of sufficiently high resolution (e.g., fraction of an inch) to visualize both small-scale cleats concentrated within individual coal bands of the coal seam and large-scale cleats cross-cutting multiple maceral bandings. In one or more embodiments of the invention, the electrical image log is calibrated with respect to a shallow resistivity log prior to use in analyzing coal seams. In one or more embodiments of the invention, the image data is a Fullbore Formation MicroImager (FMI) log generated using a FMI.

Those of ordinary skill in the art, having the benefit of this detailed description, will appreciate that natural fractures (e.g., cleats) appear more continuous on image logs, that natural fractures generally occur in more than one direction, and the nature fractures have varied morphology. Mechanically induced fractures (e.g., borehole breakouts, drilling induced fractures) tend to occur in a preferred direction based on the present day local stresses and the orientation of the borehole. Accordingly, natural fractures and mechanically induced fractures may be easily distinguished using image logs.

Those skilled in the art, having the benefit of this detailed description, will also appreciate that cleats are fractures that commonly occur perpendicular or at very high angles to the coal bedding. Accordingly, in STEP 810, high angle natural fractures in the coal seam are identified from the image data and designated as cleats. In one or more embodiments of the invention, dip analysis of the image data is used to identify primary and secondary fracture sets (i.e., face cleats, butt cleats) and the directions of said primary and secondary fracture sets.

In one or more embodiments of the invention, identifying cleats includes generating a histogram plotting the frequency of the identified fractures against the angles of said identified fractures. A coal seam having a large number (i.e., high frequency) of high angled fractures may be deemed as having a high cleat density.

In STEP 815, the fracture density and the fracture aperture for the coal seam is calculated. In one or more embodiments of the invention, the fracture density is calculated as the number of fractures per unit depth of the coal seam. In one or more embodiments of the invention, the fracture aperture is calculated based on a relationship between flushed zone resistivity, mud resistivity, and the excess current flowing through the open fracture filled with conductive mud. In one or more embodiments of the invention, the fracture aperture (W) is given by:

$$W = c \cdot A \cdot Rm^b \cdot Rxo^{(1-b)}$$

where c is a constant, b is a constant from tool modeling; A is excess current divided by voltage and integrated along a line perpendicular to the fracture trace; Rm is mud resistivity; and Rxo is flushed zone resistivity. A high fracture aperture (W) indicates the cleats are "more open" and well suited for hydrocarbon production. A low fracture value (W) indicates the cleats are "less open" and not as well suited for hydrocarbon production.

In STEP 820, the fraction density and/or the fraction aperture of the coal seam is used to verify/validate the acoustically determined cleat density of the coal seam. In one or more embodiments of the invention, verifying the acoustically determined cleat density of a coal seam includes correlating the multiple Vp/Vs ratios of the coal stream with the frequency of high angled fractures. Specifically, a coal seam identified as having a high cleat density based on large Vp/Vs ratios will also have a high frequency of high angled fractures. Similarly, a coal seam identified as having a low cleat density based on low Vp/Vs ratios will also have a low frequency of high angled fractures. Further, a coal seam identified as having the highest cleat density based Vp/Vs ratios may also have the highest frequency of high angled fractures.

In one or more embodiments of the invention, verifying the acoustically determined cleat density of a coal seam includes correlating the multiple STTC and STRC values of the coal seam with the frequency of high angled fractures. Specifically, a coal seam identified as having a high cleat density based on low STTC and STRC values will also have a high frequency of high angled fractures. Similarly, a coal seam identified as having a low cleat density based on high STTC and STRC values will have a low frequency of high angled fractures. Further, a coal seam identified as having the highest cleat density based on STTC and STRC value may also have the highest frequency of high angled fractures.

In one or more embodiments of the invention, the fracture aperture value is used to check the suitability of a coal seam for hydrocarbon production. In other words, even though two coal seems may be identified as having similar cleat densities, the coal seam with the higher fracture aperture is more suited for hydrocarbon production. Accordingly, acoustically determined cleat densities and/or cleat densities determined using image data may be cross-checked with fracture aperture values.

In one or more embodiments of the invention, when a coal seam is determined to have a high cleat density based on acoustic data (e.g., Vp/Vs ratio, STRC, STCC, etc.), but the corresponding image data (e.g., frequency of high angled fractures, fracture aperture) of said coal seam does not confirm the high cleat density (i.e., there is poor correlation between the acoustic data and image data with respect to cleat density), the acoustically determined cleat density is not verified (i.e., validated) by the image data.

Returning to FIG. 6, in STEP 625, the relationship between the face cleat orientation and the maximum HS direction is determined for each coal seam. Those skilled in the art, having the benefit of this detailed description, will appreciate that the fast shear azimuth direction is an indication of present day maximum HS direction. Accordingly, in one or more embodiments of the invention, an acoustic anisotropic analysis (e.g., Alfrod rotation) is performed on the obtained flexural waveform from a coal seam to determine the maximum HS direction for said coal seam.

Further, those skilled in the art, having the benefit of this detailed description, will also appreciate that the face cleat orientation may be determined from an image log of the coal seam. For example, face cleat orientation may be determined using dip analysis (discussed above in reference to STEP 810 of FIG. 8). Both the face cleat direction and the direction of maximum HS may be plotted on a stereo plot to determine the relationship between face cleat direction and maximum HS direction. In one or more embodiments of the invention, when the maximum HS direction is parallel to the face cleats, coal permeability is increased and the HS helps keep the face cleats open, effectively increasing primary flow during production.

In STEP 630, one or more of the coal seams are selected for completion based on cleat density, face cleat orientation, and maximum HS direction. In one or more embodiments of the invention, only coal seams having verified cleat densities are selected for completion. In addition, only coal seams that satisfy predetermined average Vp/Vs ratios and/or predetermined STRC/STTC values are selected for completion. Further, in one or more embodiments of the invention, only coal seams having a face cleat orientation parallel to the maximum HS direction are selected for completion.

In one or more embodiments of the invention, the completion method (e.g., horizontal well, hydraulic fracture, open hole or cavity, etc.) is selected based on the orientation of the face cleats relative to the maximum HS direction. Specifically, the completion method is selected to maintain well bore stability and increase production of hydrocarbons.

Figure 9:
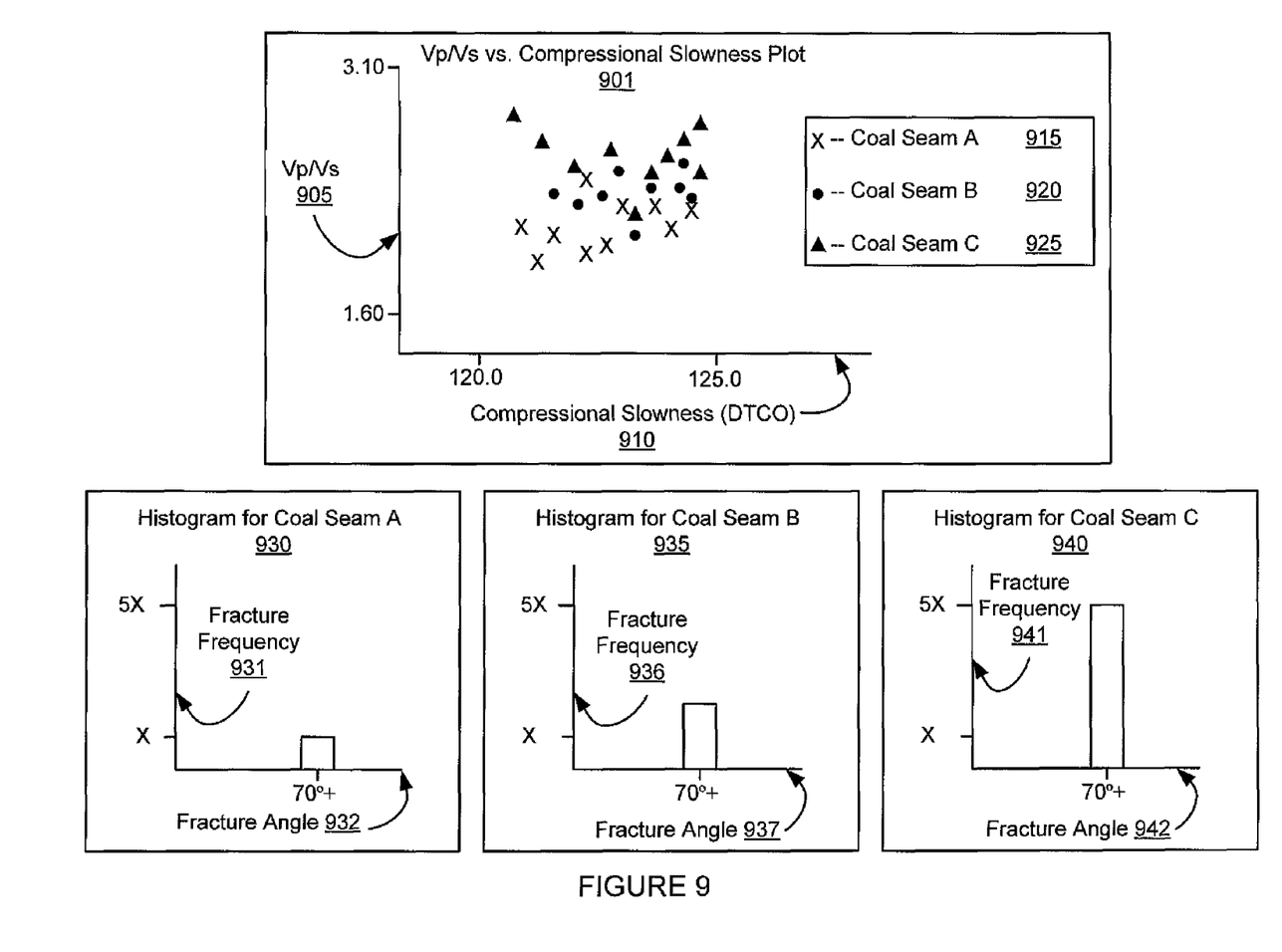
FIG. 9 shows an example in accordance with one or more embodiments of the invention.

FIG. 9 depicts an example in accordance with one or more embodiments of the invention. As shown in FIG. 9, the example includes a Vp/Vs vs. compressional slowness (i.e., DTCO) plot (901) for three coal seams (i.e., Coal Seam A (915), Coal Seam B (920), Coal Seam C (925)). As discussed above, the multiple Vp/Vs (905) values for each coal seam (915, 920, 925) correspond to different depths within each coal seam. Furthermore, said multiple Vp/Vs (905) values and their corresponding compressional slowness (910) values are determined from acoustic data (e.g., acoustic logs).

Those skilled in the art, having the benefit of this detailed description, will appreciate that the average Vp/Vs value for coal seam C (925) exceeds the average Vp/Vs value for coal seam B (920). In addition, the average Vp/Vs value for coal seam B (920) exceeds the average Vp/Vs value for coal seam A (915). As discussed above, a coal seam with a high average or high median Vp/Vs ratio is deemed as having a higher cleat density than a coal seam with a smaller average or a smaller median Vp/Vs ratio. Accordingly, the plot (901) indicates that coal stream A (915) has the lowest cleat density and coal seam C (925) has the highest cleat density.

Still referring to FIG. 9, the example also includes three histograms (i.e., Histogram for Coal Seam A (930), Histogram for Coal Seam B (935), Histogram for Coal Seam C (940)). As shown in FIG. 9, the histogram for coal seam A (930) plots the frequency of fractures in coal seam A (931) by fracture angle (932). Similarly, the histogram for coal seam B (935) plots the frequency of fractures in coal seam B (936) by fracture angle (937). Similar still, the histogram for coal seam C (940) plots the frequency of fractures in coal seam C (941) by fracture angle (942). As discussed above, the number of fractures and the angle of said fractures may be determined from image data (i.e., electrical resistivity image logs).

Those skilled in the art, having the benefit of this detailed description, will appreciate that based on the histogram for coal seam C (940) and the histogram for coal seam B (935), coal seam C (925) has more factures exceeding a fracture angle of 70 degrees than coal seam B (920). Similarly, based on the histogram for coal seam B (935) and the histogram for coal seam A (930), it is evident that coal seam B (920) has more fractures exceeding a fracture angle of 70 degrees than coal seam A (930). As discussed above, a high frequency of high angled fractures indicates a coal seam with a high cleat density. Accordingly, the histograms (930, 935, 940) indicate coal seam C (925) has the highest cleat density and coal seam A (915) has the lowest cleat density.

In one or more embodiments of the invention, the acoustically determined cleat densities are verified using the image data. In other words, an attempt is made to correlate the acoustically determined densities with the image data. For example, as discussed above, the plot (901) indicates that coal seam C (925) has a high cleat density. This is verified by the histogram for coal seam C (940), which also indicates coal seam C (925) has a high cleat density. Similarly, the plot (901) indicates that coal seam A (915) has the relatively smallest cleat density. This is verified by the histogram of coal seam C (925), which verifies that coal seam A (915) has the smallest cleat density. In one or more embodiments of the invention, as coal seam C (925) has the highest acoustically determined cleat density, and as said acoustically determined cleat density is verified by the image data, at least coal seam C (925) is selected for completion.

Although the example in FIG. 9 makes use of Vp/Vs ratios to acoustically determine cleat densities, Vp/Vs ratios and/or STTC/STRC values may be used to acoustically determine cleat densities.

Figure 10:
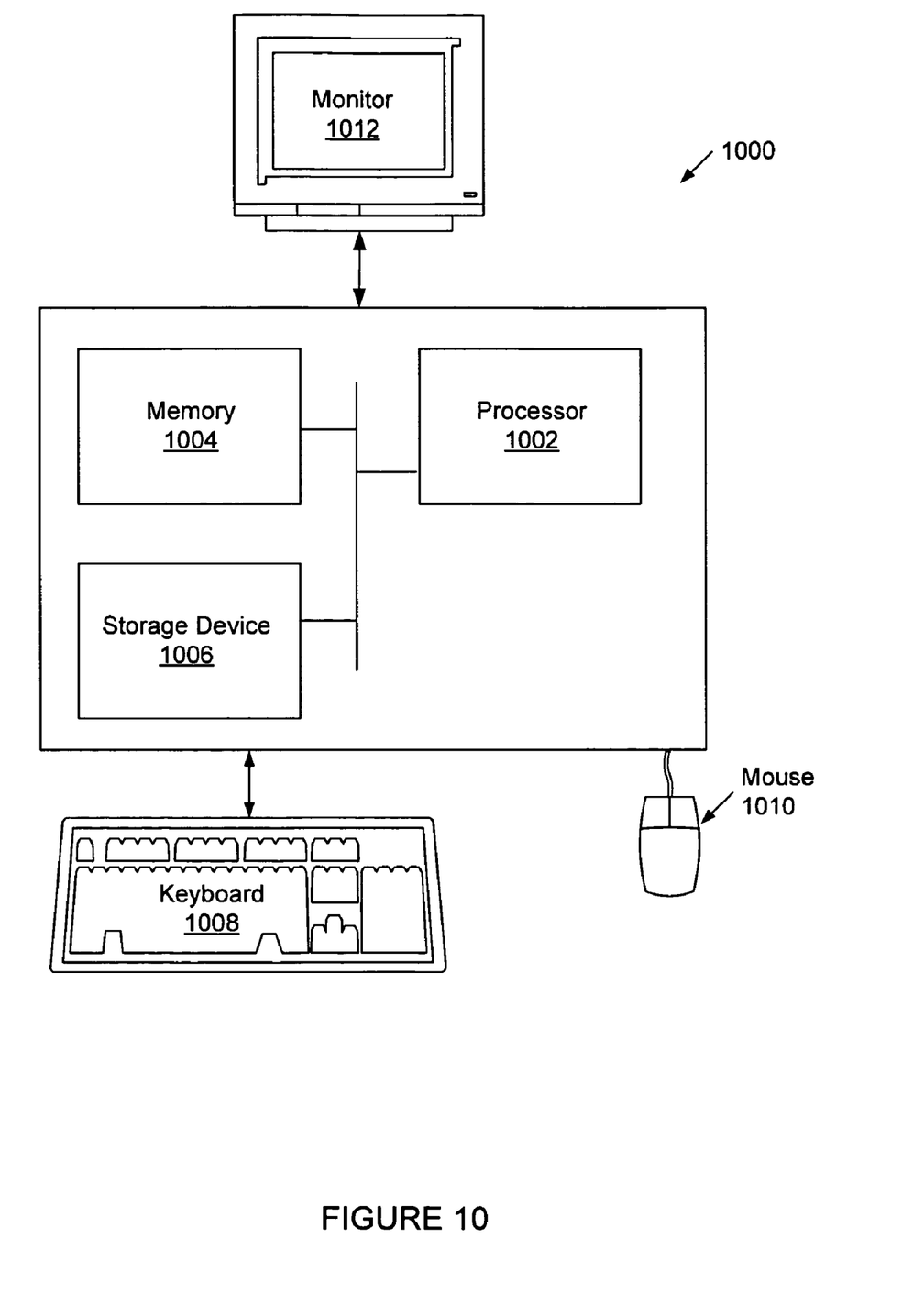
FIG. 10 shows a computer system in accordance with one embodiment of the invention.

The invention may be implemented on virtually any type of computer regardless of the platform being used. For example, as shown in FIG. 10, a networked computer system (1000) includes a processor (1002), associated memory (1004), a storage device (1006), and numerous other elements and functionalities typical of today's computers (not shown). The networked computer (1000) may also include input means, such as a keyboard (1008) and a mouse (1010), and output means, such as a monitor (1012). The networked computer system (1000) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (1000) may be located at a remote location and connected to the other elements over a network.

Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of determining completion criteria for a coal bed methane reservoir having a plurality of coal seams, comprising:
   obtaining an acoustic log and a resistivity image log for each of the plurality of coal seams;
   determining an acoustically determined cleat density for each of the plurality of coal seams using the corresponding acoustic logs;
   determining maximum horizontal stress direction for each of the plurality of coal seams using the corresponding acoustic logs;
   determining cleat orientation for each of the plurality of coal seams using the corresponding resistivity image logs;
   selecting one of the plurality of coal seams upon which to perform a completion operation based on the acoustically determined cleat density, maximum horizontal stress direction, and cleat orientation; and
   determining the completion criteria for the coal bed methane reservoir using the acoustically determined cleat density, maximum horizontal stress direction, and cleat orientation, wherein the completion operation is performed on the coal bed methane reservoir using the completion criteria.

2. The method of claim 1, further comprising:
   verifying the acoustically determined cleat density for at least one of the plurality of coal seams using the corresponding resistivity image logs.

3. The method of claim 2, wherein verifying the cleat density comprises:
   determining a resistivity determined cleat density in the one of the plurality of coal seams using the corresponding resistivity image log; and
   correlating Vp/Vs with the resistivity determined cleat density, wherein Vp and Vs are obtained from the corresponding acoustic log.

4. The method of claim 2, wherein verifying the acoustically determined cleat density comprises:
   determining a resistivity determined cleat density in the one of the plurality of coal seams using the corresponding resistivity image log; and
   correlating reflection coefficients with the resistivity determined cleat density, wherein the reflection coefficients are obtained from the corresponding acoustic log.

5. The method of claim 2, wherein verifying the acoustically determined cleat density comprises:
   determining a resistivity determined cleat density in the one of the plurality of coal seams using the corresponding resistivity image log; and
   correlating transmission coefficients with the cleat density, wherein the transmission coefficients are obtained from the corresponding acoustic log.

6. The method of claim 1, wherein the completion criteria comprises a well type and a borehole trajectory.

7. The method of claim 6, wherein the borehole trajectory is defined using the cleat orientation.

8. The method of claim 1, wherein the acoustically determined cleat density for each of the plurality of coal seams is determined using a Vp/Vs versus compressional slowness versus depth plot for each of the plurality of coal seams, wherein Vp and Vs are obtained from the corresponding acoustic logs.

9. The method of claim 8, wherein a high value of Vp/Vs correlates to a high cleat density.

10. The method of claim 1, wherein the acoustically determined cleat density for each of the plurality of coal seams is determined using a reflection coefficient versus compressional slowness versus depth plot for each of the plurality of coal seams, wherein the reflection coefficient and compressional slowness are obtained from the corresponding acoustic logs.

11. The method of claim 10, wherein a low value of the reflection coefficient indicates a high cleat density.

12. The method of claim 1, wherein the acoustically determined cleat density for each of the plurality of coal seams is determined using a transmission coefficient versus compressional slowness versus depth plot for each of the plurality of coal seams, wherein the transmission coefficient and compressional slowness are obtained from the corresponding acoustic logs.

13. The method of claim 12, wherein a low value of the transmission coefficient indicates a high cleat density.

14. The method of claim 1, wherein selecting the one of the plurality of coal seams to complete comprises determining in which of the plurality of coal seams the cleat orientation is parallel to the maximum horizontal stress direction.

15. The method of claim 1, wherein determining the cleat orientation for each of the plurality of coal seams using the resistivity image logs comprises:
 identifying cleats in the resistivity image logs;
 determining a dip for each of the identified cleats; and
 determining the cleat orientation for each of the plurality of coal seams using the corresponding dips.

16. A method of determining completion criteria for a coal bed methane reservoir comprising a coal seam, comprising:
 obtaining an acoustic log and a resistivity image log for the coal seam;
 determining an acoustically determined cleat density for the coal seam using the acoustic log;
 determining a maximum horizontal stress direction for the coal seam using the acoustic log;
 determining a cleat orientation for the coal seam using the resistivity image log; and
 determining the completion criteria for the coal bed methane reservoir using the acoustically determined cleat density, the maximum horizontal stress direction, and the cleat orientation, wherein the coal bed method reservoir is completed using the completion criteria.

17. The method of claim 16, further comprising:
 verifying the acoustically determined cleat density using the resistivity image log.

18. The method of claim 17, wherein verifying the acoustically determined cleat density comprises:
 determining a resistivity determined cleat density for the coal seam using the resistivity image log; and
 correlating Vp/Vs with the resistivity determined cleat density, wherein Vp and Vs are obtained from the acoustic log.

19. The method of claim 17, wherein verifying the acoustically determined cleat density comprises:
 determining a resistivity determined cleat density for the coal seam using the corresponding resistivity image log; and
 correlating reflection coefficients with the resistivity determined cleat density, wherein the reflection coefficients are obtained from the acoustic log.

20. The method of claim 17, wherein verifying the acoustically determined cleat density comprises:
 determining a resistivity determined cleat density for the coal seam using the resistivity image log; and
 correlating transmission coefficients with the resistivity determined cleat density, wherein the transmission coefficients are obtained from the acoustic log.

21. The method of claim 16, wherein the completion criteria comprises a well type and a borehole trajectory.

22. The method of claim 21, wherein the borehole trajectory is defined using the cleat orientation.

23. The method of claim 16, wherein the acoustically determined cleat density for the coal seam is determined using a Vp/Vs versus compressional slowness versus depth plot, wherein Vp and Vs are obtained from the acoustic log.

24. The method of claim 23, wherein a high value of Vp/Vs correlates to a high cleat density.

25. The method of claim 16, wherein the acoustically determined cleat density for the coal seam is determined using a reflection coefficient versus compressional slowness versus depth plot, wherein the reflection coefficient and compressional slowness are obtained from the acoustic log.

26. The method of claim 25, wherein a low value of the reflection coefficient indicates a high cleat density.

27. The method of claim 16, wherein the acoustically determined cleat density for the coal seam is determined using a transmission coefficient versus compressional slowness versus depth plot, wherein the transmission coefficient and compressional slowness are obtained from the acoustic log.

28. The method of claim 27, wherein a low value of the transmission coefficient indicates a high cleat density.

29. The method of claim 16, wherein determining the cleat orientation comprises:
 identifying cleats in the resistivity image log;
 determining a dip for each of the identified cleats; and
 determining the cleat orientation using the dips.

* * * * *